United States Patent
Chauvel et al.

(10) Patent No.: US 7,716,673 B2
(45) Date of Patent: May 11, 2010

(54) TASKS DISTRIBUTION IN A MULTI-PROCESSOR INCLUDING A TRANSLATION LOOKASIDE BUFFER SHARED BETWEEN PROCESSORS

(75) Inventors: Gerard Chauvel, Antibes (FR); Dominique D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 1198 days.

(21) Appl. No.: 10/632,077

(22) Filed: Jul. 31, 2003

(65) Prior Publication Data

US 2004/0025161 A1 Feb. 5, 2004

Related U.S. Application Data

(60) Provisional application No. 60/400,391, filed on Jul. 31, 2002.

(30) Foreign Application Priority Data

Jul. 30, 2003 (EP) .................................. 03291926

(51) Int. Cl.
*G06F 9/46* (2006.01)
*G06F 9/455* (2006.01)
*G06F 12/00* (2006.01)
*G06F 15/76* (2006.01)

(52) U.S. Cl. ................. 718/108; 718/1; 711/6; 711/202; 711/203; 711/204; 711/205; 712/43

(58) Field of Classification Search ......... 718/100–108, 718/1; 717/147; 711/118, 122, 207, 216, 711/145, 6, 202–205; 712/43
See application file for complete search history.

(56) References Cited

U.S. PATENT DOCUMENTS

| 4,638,426 A | * | 1/1987 | Chang et al. ................. 711/216 |
| 5,210,828 A | * | 5/1993 | Bolan et al. .................. 709/214 |
| 5,317,710 A | * | 5/1994 | Ara et al. ..................... 711/207 |
| 5,809,522 A | * | 9/1998 | Novak et al. ................. 711/118 |
| 5,940,872 A | * | 8/1999 | Hammond et al. .......... 711/207 |
| 6,006,320 A | * | 12/1999 | Parady ......................... 712/36 |
| 6,029,000 A | * | 2/2000 | Woolsey et al. ............. 717/147 |
| 6,098,089 A | | 8/2000 | O'Connor et al. ........... 709/104 |

(Continued)

FOREIGN PATENT DOCUMENTS

EP 0 313 097 4/1989
EP 1 182 570 A 2/2002

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

*Primary Examiner*—Meng-Ai An
*Assistant Examiner*—Jennifer N To
(74) *Attorney, Agent, or Firm*—Wade J. Brady, III; Frederick J. Telecky, Jr.

(57) ABSTRACT

A system comprises a first processor, a second processor coupled to the first processor, an operating system that executes exclusively only on the first processor and not on the second processor, and a middle layer software running on the first processor and that distributes tasks to run on either or both processors. A synchronization unit coupled to the first and second processors also may be provided to synchronize the processors. Further still, a translation lookaside buffer may be included that is shared between the processors. Each entry in the translation lookaside buffer ("TLB") may include a task identifier to permit the operating system or middle layer software to selectively flush only some of the TLB entries (e.g., the entries pertaining to only one of the processors).

15 Claims, 2 Drawing Sheets

U.S. PATENT DOCUMENTS

| | | | |
|---|---|---|---|
| 6,182,195 B1 * | 1/2001 | Laudon et al. | 711/141 |
| 6,260,131 B1 * | 7/2001 | Kikuta et al. | 711/210 |
| 6,567,905 B2 | 5/2003 | Otis | 711/170 |
| 6,571,260 B1 | 5/2003 | Morris | 707/206 |
| 6,668,275 B1 * | 12/2003 | Alsup et al. | 709/208 |
| 6,976,254 B2 * | 12/2005 | Kramskoy | 718/1 |
| 7,028,299 B1 * | 4/2006 | Chang | 718/104 |
| 7,137,121 B2 * | 11/2006 | Gorgone et al. | 718/108 |
| 7,318,127 B2 * | 1/2008 | Hrusecky et al. | 711/145 |
| 7,624,248 B1 * | 11/2009 | Wentzlaff et al. | 711/202 |
| 2002/0062427 A1 | 5/2002 | Chauvel et al. | |
| 2002/0065990 A1 | 5/2002 | Chauvel et al. | 711/137 |
| 2002/0069332 A1 | 6/2002 | Chauvel et al. | 711/144 |
| 2002/0073282 A1 * | 6/2002 | Chauvel et al. | 711/122 |
| 2003/0101320 A1 | 5/2003 | Chauvel et al. | 711/154 |
| 2003/0177240 A1 * | 9/2003 | Gulko et al. | 709/226 |

* cited by examiner

TASKS DISTRIBUTION IN A MULTI-PROCESSOR INCLUDING A TRANSLATION LOOKASIDE BUFFER SHARED BETWEEN PROCESSORS

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291927.6, filed Jul. 30, 2003 and entitled "A Multi-Processor Computing System Having A Java Stack Machine And A RISC-Based Processor," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003; "Memory Management Of Local Variables," Ser. No. 10/632,067, filed Jul. 31, 2003; "Memory Management Of Local Variables Upon A Change Of Context," Ser. No. 10/632,076, filed Jul. 31, 2003; "A Processor With A Split Stack," Ser. No. 10/632,079, filed Jul. 31, 2003; "Using IMPDEP2 For System Commands Related To Java Accelerator Hardware," Ser. No. 10/632,069, filed Jul. 31, 2003; "Test With Immediate And Skip Processor Instruction," Ser. No. 10/632,214, filed Jul. 31, 2003; "Test And Skip Processor Instruction Having At Least One Register Operand," Ser. No. 10/632,084, filed Jul. 31, 2003; "Synchronizing Stack Storage," Ser. No. 10/631,422, filed Jul. 31, 2003; "Methods And Apparatuses For Managing Memory," Ser. No. 10/631,252, filed Jul. 31, 2003; "Write Back Policy For Memory," Ser. No. 10/631,185, filed Jul. 31, 2003; "Methods And Apparatuses For Managing Memory," Ser. No. 10/631,205, filed Jul. 31, 2003; "Mixed Stack-Based RISC Processor," Ser. No. 10/631,308, filed Jul. 31, 2003; "Processor That Accommodates Multiple Instruction Sets And Multiple Decode Modes," Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor," Ser. No. 10/632,216, filed Jul. 31, 2003; "Program Counter Adjustment Based On The Detection Of An Instruction Prefix," Ser. No. 10/632,222, filed Jul. 31, 2003; "Reformat Logic To Translate Between A Virtual Address And A Compressed Physical Address," Ser. No. 10/632,215, filed Jul. 31, 2003; "Synchronization Of Processor States," Ser. No. 10/632,024, filed Jul. 31, 2003; "Conditional Garbage Based On Monitoring To Improve Real Time Performance," Ser. No. 10/631,195, filed Jul. 31, 2003; "Inter-Processor Control," Ser. No. 10/631,120, filed Jul. 31, 2003; "Cache Coherency In A Multi-Processor System," Ser. No. 10/632,229, filed Jul. 31, 2003 "A Multi-Processor Computing System Having A Java Stack Machine And A RISC-Based Processor," Ser. No. 10/631,939, filed Jul. 31, 2003.

BACKGROUND OF THE INVENTION

1. Technical Field

The present subject matter relates generally to a multi-processor, single operating system computing system.

2. Background Information

Despite well recognized advantages of using Java code such as portability, security, and code density, Java execution remains relatively slow thus militating against a wider acceptance into the marketplace. One of the performance bottlenecks in Java execution environments is the latency induced by native tasks, such as real-time processing or garbage collection. Accordingly, improvements to accelerate the execution of Java are desirable.

BRIEF SUMMARY

In some embodiments a system comprises a first processor, a second processor coupled to the first processor, an operating system that executes exclusively only on the first processor and not on the second processor, and a middle layer software running on the first processor and that distributes tasks to run on either or both processors. A synchronization unit coupled to the first and second processors also may be provided to synchronize the processors. Further still, a translation lookaside buffer may be included that is shared between the processors. Each entry in the translation lookaside buffer ("TLB") may include a task identifier ("ID") to permit the operating system or middle layer software to selectively flush only some of the TLB entries (e.g., the entries pertaining to only one of the processors).

In other embodiments, a method usable in a multi-processor system comprises executing an operating system on only one of a plurality of processors and distributing tasks to each of the plurality of processors by middle layer software running on the processor on which the operating system executes. The method also may comprise synchronizing the processors as well as selectively flushing a shared TLB based on task identifier values included in the TLB.

Notation and Nomenclature

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
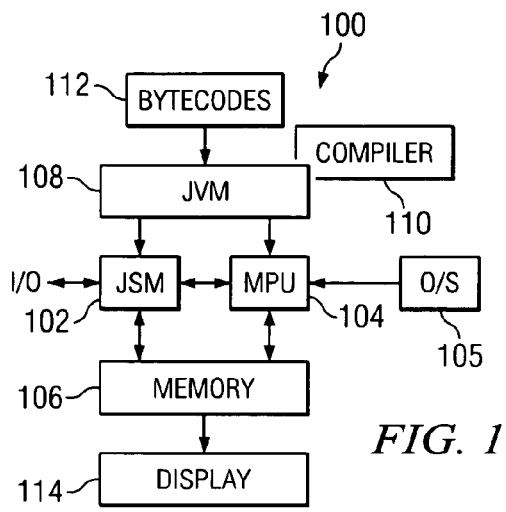
FIG. 1 shows a diagram of a system in accordance with preferred embodiments of the invention and including a Java Stack Machine ("JSM") and a Main Processor Unit ("MPU")

Referring now to FIG. 1, a system 100 is shown in accordance with a preferred embodiment of the invention. As shown, the system includes at least two processors 102 and 104. Processor 102 comprises the Java optimized processor and is referred to for purposes of this disclosure as a Java Stack Machine ("JSM"). Processor 104 is referred to as a Main Processor Unit ("MPU") and preferably is a RISC processor. System 100 also may include memory 106 coupled to both the JSM 102 and MPU 104 and thus is accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired.

Referring still to FIG. 1, as is generally known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") 105, which performs various functions including system memory management, the system task management that schedules the JVM 108 and most or all other native tasks running on the system, management of the display 114, receiving input from input devices, etc. The O/S 105 preferably runs exclusively on the MPU 104 and thus does not run on the JSM 102 or other processors, if included. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

FIG. 1 thus illustrates a multi-processor system having in which an operating system is executed exclusively on one of the processors. In at least this way, the system is asymmetric.

With only one processor running an operating system several advantages are obtained over multiprocessor systems having an operating system running on each processor. For example, in a multi-operating system environment, coordination between operating system instances is problematic and may result in an undesirable amount of latency with regard to inter-processor communication. The multi-processor, single O/S implementation described herein generally results in lower communication overhead and lower complexity than distributed operating system systems. Additionally, the single O/S configuration described herein may result in lower code size than in multiple O/S configurations. The following description addresses various features useful to implement the multi-processor, single O/S system of the preferred embodiment. The features described below comprise the ability to selectively flush a shared translation lookaside buffer and synchronization logic used to synchronize the JSM 102 and MPU 104.

Figure 2:
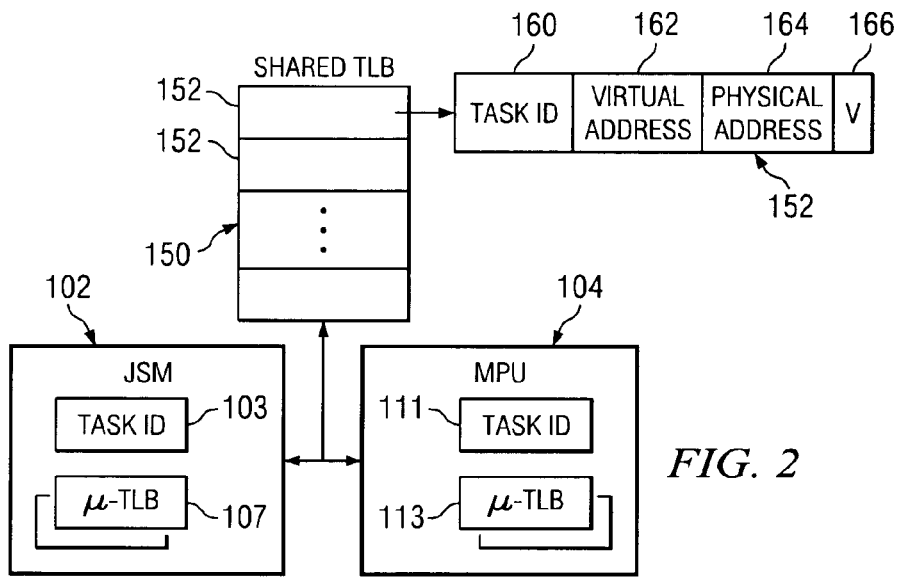
FIG. 2 shows illustrates the use of a translation lookaside buffer ("TLB") incorporating a task identifier field to permit selective TLB flushing.

In FIG. 2, the JSM 102 and MPU 104 are shown coupled to a shared translation lookaside buffer ("TLB") 150. The TLB 150 preferably is implemented in a storage device that may be separate from memory 106. The TLB 150 preferably includes a plurality of entries 152 in which virtual address to physical address translations are stored. Each entry 152 thus includes a virtual address 162 and a corresponding physical address 164. Each TLB entry may include a task identifier ("task ID") 160 and a V field 166. Other fields also may be included in the TLB entries, but are not shown in FIG. 2. The TLB 150 may be programmed in any suitable manner. For instance, as described in copending application Ser. No. 10/157,555 entitled "Cache With Selective Write Allocation" and incorporated herein by reference, a memory transaction resulting in a TLB miss may initiate a TLB handler routine to load the missing reference into the TLB.

Each processor 102 and 104 includes one or more micro-TLBs 107 and 113. Micro-TLBs may be associated with various components of the processors to provide lower latency virtual-to-physical address translations. The micro-TLBs may contain fewer translations than their corresponding main TLB, although the relative size of a micro-TLB versus the main TLB is not significant to this disclosure.

On a micro-TLB miss, the shared TLB 150 is searched. In the case of a hit on the shared TLB 150, the micro-TLB that missed is loaded with the entry content of the shared TLB. In the case of a miss in the shared TLB 150, a TLB handler loads the relevant entry into the shared TLB and the micro-TLB that initially missed.

Referring still to FIG. 2, each TLB entry preferably contains a task ID field 160. Each processor also contains a task ID register 103, 111 as shown. In some embodiments, the O/S may distribute a task to run on either of the processors 102 or 104. Each task is assigned a task ID. The task ID assigned to a task is written to the task ID register of the processor being requested to execute the task. As such, the task ID register 103, 111 of each processor holds the task ID of the task currently running on that processor. When a shared TLB search occur, the task ID is matched together with the virtual address in the respective TLB match fields to retrieve the physical page descriptor. The O/S preferably retains a history of the tasks that have been assigned to each processor and the task IDs of those tasks. That is, the O/S maintains a table that contains, for each processor, a list of the task IDs of the tasks that have run on the JSM 102 and the tasks that have run on the MPU 104. In a JAVA environment, the JVM 108, for instance, may write the JVM task ID register with a value corresponding to the JVM task ID on the MPU 104, so that the O/S sees all JAVA tasks with the same ID.

The information in this table permits the O/S running on the MPU 104 to selectively flush the entries in the shared TLB 150. Flushing a TLB entry refers to invalidating the entry by clearing a valid bit in V field 166. Flushing one or more TLB entries may be desirable when switching contexts. Rather than being forced to flush all of the entries in the shared TLB, the O/S may flush only the entries relevant to tasks running on the MPU 104 or only entries relevant to tasks running on the JSM 102. The selection of which entries to flush preferably is based on the task ID values. For instance, if tasks 1, 3 and 5 are assigned to the JSM 102 and tasks 2, 4, and 6 are assigned to the MPU 104, the O/S can issue a command to flush only those entries in the TLB 150 whose task identifier field 160 contains the task ID 2, 4 or 6. All other TLB entries will remain unchanged. With the O/S selectively flushing, for example, only the tasks associated with the MPU 104, the performance impact to the JSM 102, which would otherwise result if the entire TLB was invalidated, is reduced or eliminated.

In other embodiments, middle layer software may be responsible for selectively flushing the shared TLB 150. An example of such middle layer software is the JVM 108.

As described above, the shared TLB 150 can be selectively flushed based on task ID. In general, a micro-TLB only contains translations relevant to the processor in which the micro-TLB resides. As such, the selective flushing feature of the shared TLB 150 need not be extended to the micro-TLBs. However, in alternate embodiments, one or more micro-TLB may have translations pertaining to multiple processors. In this case, the selective flushing technique may be applied to such a micro-TLB by including a task ID field to each micro-TLB entry.

In some situations, it may be desired for a processor to switch its "context." Switching context generally comprises one or more actions such as saving the current state of some or all registers so that new threads may run on the processor with new address translations. In accordance with a preferred embodiment, the JSM 102 can switch its own context when triggered by the MPU 104 without further assistance from the MPU. The ability of the JSM 102 to autonomously switch context reduces latency induced on MPU 104 so that the overhead impact on the O/S due to the attached processor context switches is limited.

Figure 5:
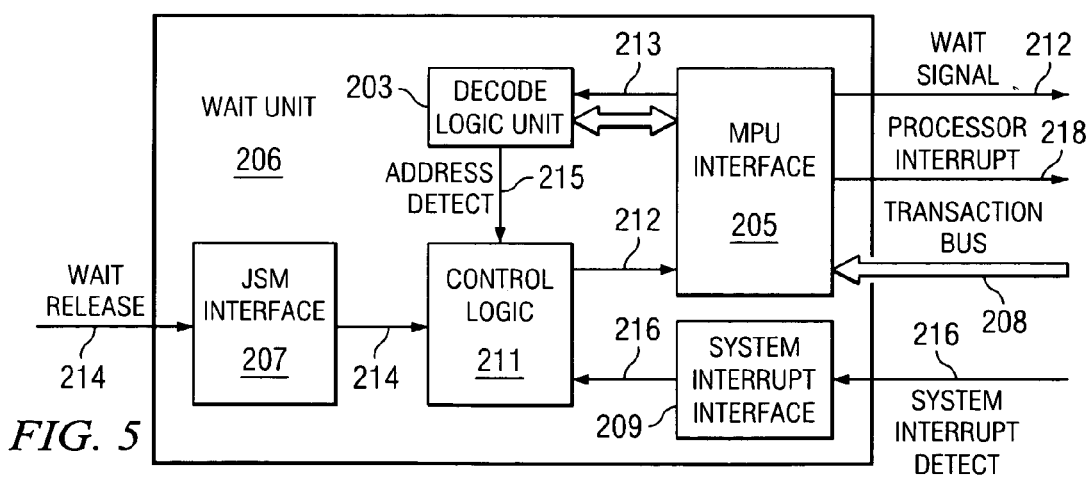
FIG. 5 shows a block diagram of the synchronization unit used in the embodiments of FIGS. 3 and 4.
Figure 3:
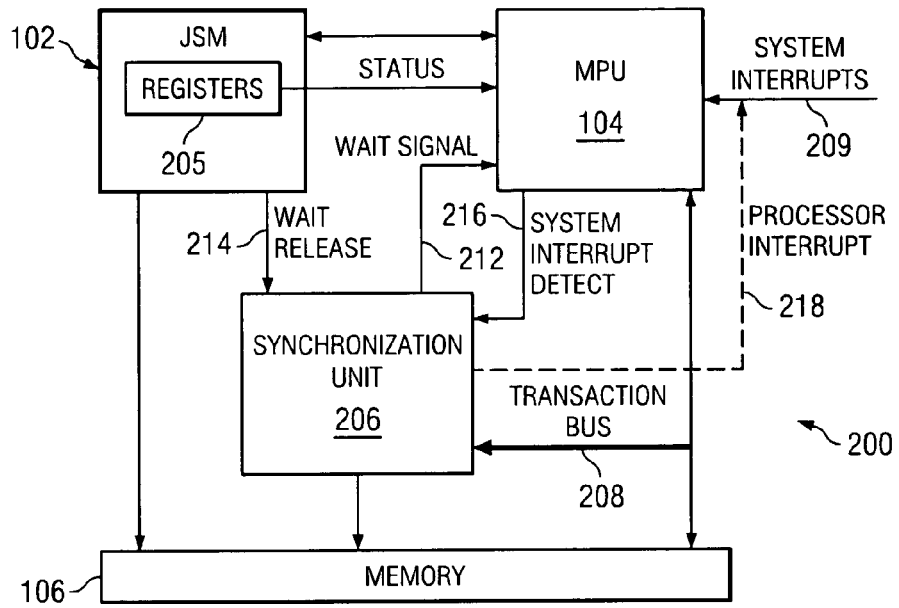
FIG. 3 shows a preferred embodiment using a synchronization logic unit coupled to the JSM and MPU.
Figure 4:
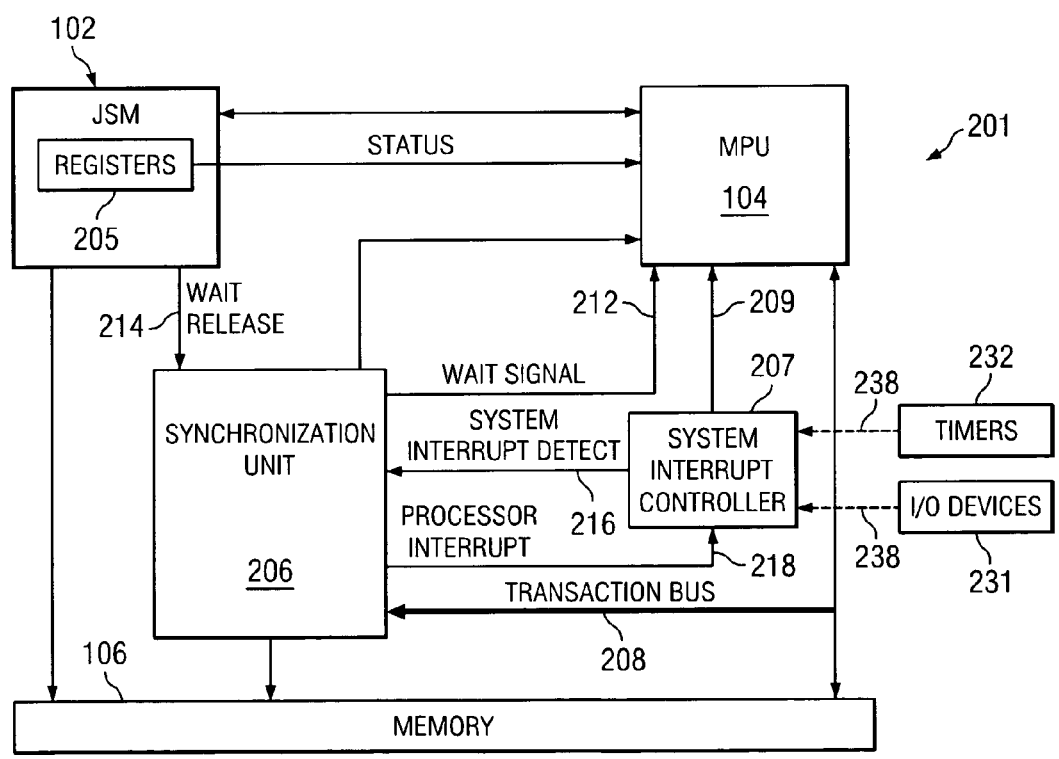
FIG. 4 shows an alternative embodiment using a synchronization logic unit coupled to the JSM and MPU.

FIGS. 3-5 illustrate various techniques usable to synchronize the operation of multiple processors in a system 200. As shown, the system 200 may comprise the JSM 102, the MPU 104, a synchronization unit 206, a transaction bus 208, memory 106, and a variety of signals such as a wait signal 212, a wait release 214, system interrupts 209, a system interrupt detect signal 216, and a processor interrupt 218. Other components (not shown) may be included as well. The synchronization logic 206 synchronizes the processors 102 and 104.

In operation, the MPU 104 performs memory accesses through a transaction bus 208 to memory 106. These accesses may include read or write cycles targeting various locations in memory 106. The transaction bus 208 preferably is also provided to synchronization unit 206, thereby permitting the synchronization unit 206 to monitor transactions that target one or more predetermined addresses as will be explained below.

In accordance with the preferred embodiments, at least one address (or a range of addresses) is selected or otherwise predetermined to be used to place the MPU 104 in a "wait" mode. The wait mode is generally specific to the particular processor selected as processor 104 and may include a lower performance or lower power mode in which, for example, one or more clocks internal to the processor 104 are disabled. The pre-determined address preferably is mapped to a physical memory location and thus can be used as a mechanism for initiating the MPU's transition to the wait mode. To initiate the transition to the wait mode, the MPU 104 preferably performs a read or write access targeting the address pre-determined for use for this purpose. As such, when the synchronization unit 206 detects an access on transaction bus 208, the synchronization unit 206 determines whether the access is for the pre-determined address. The synchronization unit 206 responds to the detection of the access having the pre-determined address by asserting wait signal 212 to the MPU 104.

In another embodiment, instead of mapping this transaction to a physical address, the transaction could be mapped on a dedicated communication bus (i.e., a co-processor bus) between the MPU 104 and the JSM 102, whereby a transaction to the specific address of the communication bus or a specific command on the communication bus performs the same function as addressing a physical memory address While the MPU 104 is in a wait mode, the JSM 102 may execute instructions or otherwise be occupied. The JSM 102 may encounter an instruction that requires support from, or at least benefits from support by, the MPU 104. Accordingly, the JSM 102 may assert a wait release signal 214 to the synchronization unit 206, thereby causing the synchronization unit 206 to de-assert the wait signal 212. Once the wait signal 212 is de-asserted as described below, the MPU 104 can execute the instruction for which the JSM 102 needed support.

In at least some embodiments, upon "waking up," the MPU 104 preferably requests a status from the JSM 102. The status may include, without limitation, one or more status bits of a register 205 that indicate whether the JSM 102 is actively executing instructions and identify any instruction(s) that the MPU 104 is to execute.

In addition to being awoken by the assertion of the wait release signal 214 by the JSM 102, the MPU 104 may be awoken by a system interrupt 209. The system interrupt 209 may be sent to the MPU 104, which asserts a system interrupt detect signal 216 to the synchronization unit 206 to cause the de-assertion of the wait signal 212. The system interrupt 209 may be sent by a variety of system components (not shown), for example, I/O devices, timers, etc., to allow the MPU 104 to carry out, for example, routine maintenance, such as memory allocation and de-allocation, and other operations as desired.

After finishing the task prompted by the system interrupt 209, the MPU 104 may read the status of the JSM 102. If the JSM 102 is in an idle state (i.e., the JSM 102 is not actively executing instructions), the MPU 104 may execute one or more instructions on behalf of the JSM 102. As previously described, the JSM 102 may encounter an instruction that requires, or at least benefits from, the support of the MPU 104. Thus, this instruction may be executed by the MPU 104.

In at least some embodiments of the invention, the MPU 104 may prioritize multiple tasks when awake. For example, if the MPU 104 has been awoken by a system interrupt 209, more than one interrupt source may have positioned the system interrupt 209 and the MPU 104 will perform the associated tasks according to their pre-determined priority. In at least some embodiments, an operating system ("O/S") running on the MPU 104 may control the order in which the MPU 104 carries out multiple interrupt requests.

In some situations, for example, when a system interrupt 209 has awoken the MPU 104 as described above, the JSM 102 may be unaware that the MPU 104 has awoken. In this situation the JSM 102 may assert the wait release signal 214 as described above to obtain processing support from the MPU 104. Assertion of the wait release signal in this context causes the synchronization unit 206 to assert a processor interrupt signal 218 to the MPU 104. The asserted processor interrupt signal 218 preferably causes the MPU to temporarily stop executing a task, e.g. a routine maintenance task initiated upon occurrence of a system interrupt 209, to execute instructions as requested by the JSM 102. In other embodiments, the processor interrupt signal 218 is not used and any request by the JSM 102 is handled after the MPU 104 has finished the task(s) initiated by a system interrupt 209.

In embodiments in which multiple signals (e.g. system interrupt 209, system interrupt detect 216, wait release 214) occur simultaneously, approximately simultaneously, or concurrently, the operating system ("O/S") running on the MPU 104 may decide, according to a pre-determined priority, whether the MPU 104 will execute instructions as requested by the JSM 102 or execute the task(s) requested by the system interrupt 209. As shown in FIG. 3, the processor interrupt signal 218 asserted by the synchronization unit 206 as described above may be received by the MPU 104 as a system interrupt 209 and handled according to a pre-determined priority. More specifically, the embodiment described above enables the O/S running on the MPU 104 to schedule multiple types of support requests from the JSM 102 relative to their respective priority as compared to other requests (e.g., system interrupts 209) handled by the MPU 104. Some of the support request from the JSM 102 may have lower priority than some system interrupts 209, while other support requests from the JSM 102 have a higher priority. The priority of a support request from the JSM 102 may be included in the status read by the MPU 104 as described above. The processor interrupt may itself contain the priority information as well.

FIG. 4 is a diagram illustrating another embodiment of the invention. As shown in FIG. 4, system 201 comprises the same components and signals as system 200 of FIG. 3, with the addition of a system interrupt controller 207. The system interrupt controller 207 preferably receives the processor interrupt signal 218 from the synchronization unit 206 and request signals 238 from system components (e.g., I/O devices 231, timers 232, or other devices), and asserts the system interrupt detect 216 signal to the synchronization unit 206 and the system interrupt signal 209 to the MPU 104. The function of the components and signals of system 201 is otherwise described above for system 200.

FIG. 5 is a block diagram illustrating an embodiment of the synchronization unit 206. As shown in FIG. 5, the synchronization unit 206 may comprise a decode logic unit 203, a MPU interface 205, a JSM interface 207, a system interrupt interface 209, and control logic 211. The control logic 211 preferably couples to the MPU interface 205, the JSM interface 207, and the system interrupt interface 209 as shown. Transaction information 213 (e.g., address, clock, or other information as may be helpful to detect that a transaction has been or is in the process of being made) received through transaction bus 208 preferably is provided by the MPU interface 205 to the decode logic unit 203.

The decode logic unit 203 detects a transaction targeting a pre-determined address that is initiated by the MPU as described above. For example, if the transaction is detected by recognizing that a pre-determined address has been or is to be accessed, the decode logic unit 203 may assert an address detect signal 236 to the control logic 211 when the transaction bus address matches the pre-determined address or falls within a pre-determined range of addresses. Upon detecting the assertion of the address detect signal 215, control logic 211 preferably asserts the wait signal 212 which is propagated via the MPU interface 205 to the MPU as described above. The control logic 211 may assert, or not, the wait signal when it receives an address detect signal 215 depending on the state of the wait release signal 214 and the system interrupt signal 216.

Referring still to FIG. 5, the JSM interface 207 may be used to receive a wait release signal 214 from the JSM as explained above. The JSM interface 207 may then propagate the wait release signal 214 to the control logic 211. If the wait signal 212 is already de-asserted when a wait release signal 214 is received, a processor interrupt signal 218 may be asserted. More specifically, the control logic 211 may assert, or not, the processor interrupt signal 218 when it receives a wait release signal 214 depending on the state of the address detect signal 215 and the state of the wait signal 212. As explained above, the processor interrupt 218 may permit the MPU to temporarily stop executing a task, in order to execute one or more instructions for the JSM 102.

The system interrupt interface 209 receives the system interrupt detect signal 216 from the MPU or system interrupt controller and propagates the system interrupt detect signal 216 to the control logic 211. The control logic 211 may de-assert the wait signal 212 when it receives the wait release signal 214 and/or the system interrupt detect signal 216. As previously described, the assertion and de-assertion of the wait signal 212 causes a processor to enter or wake up from a wait mode. In at least some embodiments, the control logic 211 may receive inputs, e.g., system interrupt detect 216, address detect signal 215, wait release signal 214, etc., and accordingly asserts or de-asserts the wait signal 212.

As described above, the synchronization unit 206 may be used in combination with the JSM and MPU processors 102 and 104. As such, the synchronization unit 206 may function to synchronize the operation of the JSM and MPU to permit efficient switching between such processors. The synchronization unit 206 which is shown as a separate unit in FIGS. 3 and 4, may be included as part of the JSM 102 in some embodiments of the invention.

Figure 6:
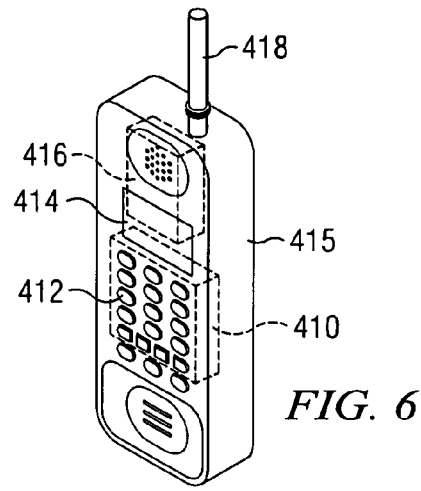
FIG. 6 depicts an exemplary embodiment of the system described herein in the form of a communication device (e.g., cellular telephone).

System 100 may be representative of, or adapted to, a wide variety of electronic systems, an exemplary electronic system may comprise a battery-operated, mobile cell phone such as that shown in FIG. 6. As shown in FIG. 6, a mobile communications device 415 includes an integrated keypad 412 and display 414. The JSM 102 and MPU 104 noted above and other components may be included in electronics package 410 which may be coupled to keypad 415, display 414, and radio frequency ("RF") circuitry 416 which may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A system comprising:
   a first processor;
   a second processor coupled to the first processor, and only the first processor configured to execute a single operating system, the second processor not executing an operating system;

a middle layer software configured to execute on the first processor and configured to distribute tasks to run on either or both processors; and a shared translation lookaside buffer (TLB) configured to contain a plurality of entries in which virtual-to-physical address translations are stored, each entry also comprising a task ID field in which a task ID associated with the corresponding translation and with a task running on the first or second processor is stored, wherein at least one of the shared TLB entries are invalidated, and those entries that are invalidated have task IDs that are associated with tasks that are running or have run on only one of the first or second processors.

2. The system of claim 1 wherein the middle layer software comprises a Java virtual machine.

3. The system of claim 1 further comprising a synchronization unit coupled to the first and second processors, said synchronization unit configured to synchronize the execution of the first and second processors.

4. The system of claim 3 wherein the synchronization unit is configured to cause the first processor to transition to a wait mode while the second processor executes a task.

5. The system of claim 4 wherein the first processor is configured to transition from the wait mode to a fully operational mode by a signal asserted by the either the first or second processor to the synchronization unit.

6. The system of claim 1 wherein the operating system is configured to selectively flush at least one of the entries in the shared TLB based on task ID.

7. The system of claim 1 wherein the middle layer software is configured to selectively flush at least one of the entries in the shared TLB based on task ID.

8. The system of claim 7 wherein the middle layer software comprises a Java virtual machine.

9. The system of claim 1 wherein the second processor has a programmable context and is configured to autonomously switch its own context without support from the operating system executing on the first processor.

10. The system of claim 1 wherein the second processor includes a programmable task ID register which is configured to contain a value indicative of the task currently running on the second processor that is written by the middle layer software running on the first processor.

11. A method usable in a multi-processor system, comprising:

executing a single operating system in the multi-processor system, the single operating system executing on only one of a plurality of processors, the remaining ones of the plurality of processors not executing an operating system;

distributing tasks to each of the plurality of processors by middle layer software running on the processor on which the operating system executes, wherein each task has a unique task identifier value and the method further comprises writing virtual-to-physical address translations and task identifier values associated with the task to which the translations pertain into a translation lookaside buffer that is shared between the plurality of processors; and selecting task identifier values and invalidating entries in the translation lookaside buffer that contain the selected task identifier values and not invalidating other entries in the translation lookaside buffer.

12. The method of claim 11 wherein distributing tasks comprises distributing tasks by a Java virtual machine.

13. The method of claim 11 further comprising causing the processor on which the operating system executes to transition to a wait mode while another processor executes tasks and subsequently transitioning the processor in the wait mode to an active mode as a result of a signal being asserted by any of the plurality of processors.

14. The method of claim 11 wherein, in a processor having a context and that does not execute the operating system, autonomously switching said context without support from the operating system.

15. The method of claim 11 further comprising writing a task ID register by the processor executing the operating system, the task ID register contained in another processor.

* * * * *